(12) United States Patent
Kawamura

(10) Patent No.: US 11,754,113 B2
(45) Date of Patent: Sep. 12, 2023

(54) ROTARY BODY

(71) Applicant: YAMABIKO CORPORATION, Tokyo (JP)

(72) Inventor: Kunimune Kawamura, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 17/917,050

(22) PCT Filed: Apr. 6, 2021

(86) PCT No.: PCT/JP2021/014595
§ 371 (c)(1),
(2) Date: Oct. 5, 2022

(87) PCT Pub. No.: WO2021/206081
PCT Pub. Date: Oct. 14, 2021

(65) Prior Publication Data
US 2023/0151844 A1 May 18, 2023

(30) Foreign Application Priority Data
Apr. 7, 2020 (JP) ................. 2020-068836

(51) Int. Cl.
F16C 3/22 (2006.01)
F02B 75/32 (2006.01)
F16C 3/20 (2006.01)

(52) U.S. Cl.
CPC ............. F16C 3/22 (2013.01); F16C 3/20 (2013.01); F02B 75/32 (2013.01)

(58) Field of Classification Search
CPC ...... F16C 3/04; F16C 3/22; F16C 3/30; F16C 3/20; F02B 75/32
See application file for complete search history.

(56) References Cited

U.S. PATENT DOCUMENTS 6,062,180 A      5/2000  Carlback
6,418,902 B1 *   7/2002  Ericson ................. F02B 33/04
                                              123/192.2

(Continued)

FOREIGN PATENT DOCUMENTS

CN    112727905 A  *  4/2021  .............. F02B 75/02
EP    1729020 A1   * 12/2006  .............. F16C 3/22
GB    2566709 A       3/2019

(Continued)

OTHER PUBLICATIONS

Machine translation of JP 2007-24155 A obtained on Apr. 17, 2023.*

*Primary Examiner* — Adam D Rogers
(74) *Attorney, Agent, or Firm* — BakerHostetler

(57) ABSTRACT

The rotary body according to the present invention is made of resin and attached to a crankshaft. The rotary body has an outside plate element and an inside plate element which are attached to an outside surface and an inside surface of an arm portion of the crankshaft, respectively, and a pair of filler elements disposed between the outside plate element and the inside plate element and on both sides of the arm portion. The outside plate element and the pair of filler elements are coupled to each other, and the pair of filler elements and the inside plate element are coupled to each other.

11 Claims, 5 Drawing Sheets

(56) References Cited

U.S. PATENT DOCUMENTS 8,468,910 B2 * 6/2013 Osawa .................. F16C 3/20
    123/192.1
2012/0137827 A1 6/2012 Osawa

FOREIGN PATENT DOCUMENTS

| JP | 2005140170 A | 6/2005 |
| JP | 2007024155 A | 2/2007 |
| JP | 2012117630 A | 6/2012 |

* cited by examiner

ROTARY BODY

CROSS REFERENCE TO RELATED APPLICATIONS

This application is a National Stage Application of International Patent App. No. PCT/JP2021/014595, filed Apr. 6, 2021, which claims the benefit of Japanese Patent Application No. 2020-068836 filed on Apr. 7, 2020, the entire disclosures of both of which are hereby incorporated by reference as if set forth in their entirety herein.

TECHNICAL FIELD

The present invention relates to a rotary body attached onto a crankshaft of an engine.

BACKGROUND ART

A two-stroke engine is used in many small working machines such as a chainsaw, a mower, and a blower.

In the two-stroke engine, while a piston is raised, mixed gas of fuel and air in a combustion chamber is compressed and a negative pressure is caused in a crank chamber so that when an intake passage communicates with the crank chamber, the crank chamber is filled with new mixed gas of fuel and air through the intake passage. Then, while the piston is lowered due to explosion in the combustion chamber and when an exhaust passage communicates with the combustion chamber, combustion gas is exhausted through the exhaust passage. Further, the mixed gas in the crank chamber is compressed so that when the crank chamber communicates with the combustion chamber through a scavenging passage, the mixed gas flows from the crank chamber through the scavenging passage into the combustion chamber.

In the two-stroke engine, it is known that a compression ratio of the mixed gas in the crank chamber (primary compression ratio) can be increased by reducing a volume or an empty space in the crank chamber, so that output performance, acceleration performance, and reduction of emissions (emission of air pollutants such as hydrocarbons) of the engine can be enhanced.

Further, the crankshaft includes a shaft portion disposed on a rotational axis, an arm portion extending from the shaft portion in a radial direction, and a counterweight portion in a substantially semicircular form disposed on an opposite side with respect to the arm portion in the radial direction, wherein the arm portion and the counterweight portion define a substantially T shape. Thus, it is known that a pair of filler elements are attached to the crankshaft, and spaces adjacent to the arm portion and the counterweight portion are filled with the pair of filler elements to reduce the empty space in the crank chamber (for example, see the Patent Publications 1-3). Please note that the filler elements attached to an opposite side with respect to the counterweight portion are lightweight or made of resin, so that the filler elements do not greatly restrict the function of the counterweight portion.

PRIOR ART PUBLICATION

Patent Publication 1: U.S. Pat. No. 6,062,180.
Patent Publication 2: Japanese Patent Laid-open Publication No. 2005-140170.
Patent Publication 3: Japanese Patent Laid-open Publication No. 2012-117630.

SUMMARY OF THE INVENTION

Problem to be Solved by the Invention

When the spaces adjacent to the arm portion and the counterweight portion are filled with the resin filler elements, the filler elements may be deformed at a high rotational speed. To reduce such deformation, a metal cup or band surrounding the resin filler elements may have been used (see the Patent Publications 1 and 2). In this case, the function of the counterweight portion may be restricted due to weight of the metal cup or band.

Further, in the Patent Publication 3, an S-shaped wire is used for attachment of the resin filler elements. In this case, if an area around the wire is filled with the filler elements, the empty space in the crank chamber can be more reduced.

Thus, an object of the present invention is to provide a rotary body that can be attached onto the crankshaft without using metal and can reduce the empty space in the crank chamber. Preferably, an object of the present invention is to provide a rotary body which can be easily attached to the crankshaft.

Means for Solving the Problem

To achieve the above-stated object, the rotary body according to the present invention is made of resin and attached to a crankshaft which is rotatable about a rotational axis; the crankshaft having a shaft portion which is disposed on the rotational axis and supported by a bearing, an arm portion and a counterweight portion which are connected to an end of the shaft portion perpendicularly with respect to the rotational axis, and a crankpin portion which is offset from the rotational axis and extends from the arm portion parallel to the rotational axis, the arm portion having an outside surface on a side toward the shaft portion, and an inside surface on a side toward the crankpin portion; and, the rotary body including an outside plate element which is attached to the outside surface of the arm portion, an inside plate element which is attached to the inside surface of the arm portion, and a pair of filler elements which are disposed between the outside plate element and the inside plate element and on both sides of the arm portion, wherein the outside plate element and the pair of the filler elements are coupled to each other, and the pair of the filler elements and the inside plate element are coupled to each other.

The rotary body configured in this way is made of resin, while the outside plate element attached to the outside surface of the arm portion, the inside plate element attached to the outside surface of the arm portion, and the pair of the filler elements disposed between the outside plate element and the inside plate element on both sides of the arm portion are attached together to the crankshaft to surround the arm portion, namely, no metal is needed to be used. By attaching the rotary body to the crankshaft, the empty space in the crank chamber can be reduced.

In an embodiment of the present invention, preferably, the outside plate element has an aperture for fitting onto the shaft portion, and the inside plate element has an engagement feature to be positioned to the arm portion, and more preferably, the outside plate element has an engagement feature to be positioned to the crankpin portion.

Since the rotary body configured in this way is positioned on the crankshaft by the aperture and the engagement feature, deformation at a high rotational speed can be restricted.

In an embodiment of the present invention, preferably, each of the pair of the filler elements has an interior space sealed by the outside plate element and the inside plate element.

In the rotary body configured in this way, since each of the pair of the filler elements has the interior space, the rotary body can be made lighter.

In an embodiment of the present invention, each of the pair of the filler elements may be solid.

In an embodiment of the present invention, preferably the outside plate element and the pair of the filler elements are integrally preformed as an outside part, and the inside plate element is coupled to the outside part.

In the rotary body configured in this way, the rotary body can be attached to the crankshaft even if the distance between the pair of the arm portions is small. Thus, the empty space in the crank chamber can be reduced.

In the embodiment of the present invention in which the pair of the filler elements are solid, preferably, the outside plate element and the pair of the filler elements are integrally preformed as an outside part, the inside plate element has a pin, the outside plate element and the pair of the filler elements have a through aperture fitted onto the pin, and the pin and the through aperture are coupled together, and more preferably, the pin and the through aperture are disposed at a position of the center of gravity of the filler elements.

In the rotary body configured in this way, when the inside plate element and the outside part are coupled to each other, the pin can be accessed from outside of the through aperture. Thus, the rotary body can be easily attached to the crankshaft. Also, when the pin and the through aperture are formed at the position of the center of gravity of each of the pair of the filler elements, deformation of portions of the inside plate element and the outside part, which are not coupled to each other, is restricted at a high rotational speed.

In an embodiments of the present invention, preferably, the outside plate element is disposed adjacent to the bearing supporting the shaft portion and has an annular protrusion extending between an outer ring and an inner ring of the bearing.

In the rotary body configured in this way, the empty space in the crank chamber can be further reduced by the annular protrusion extending between the outer ring and the inner ring of the bearings.

DESCRIPTION OF EMBODIMENTS

Figure 1:
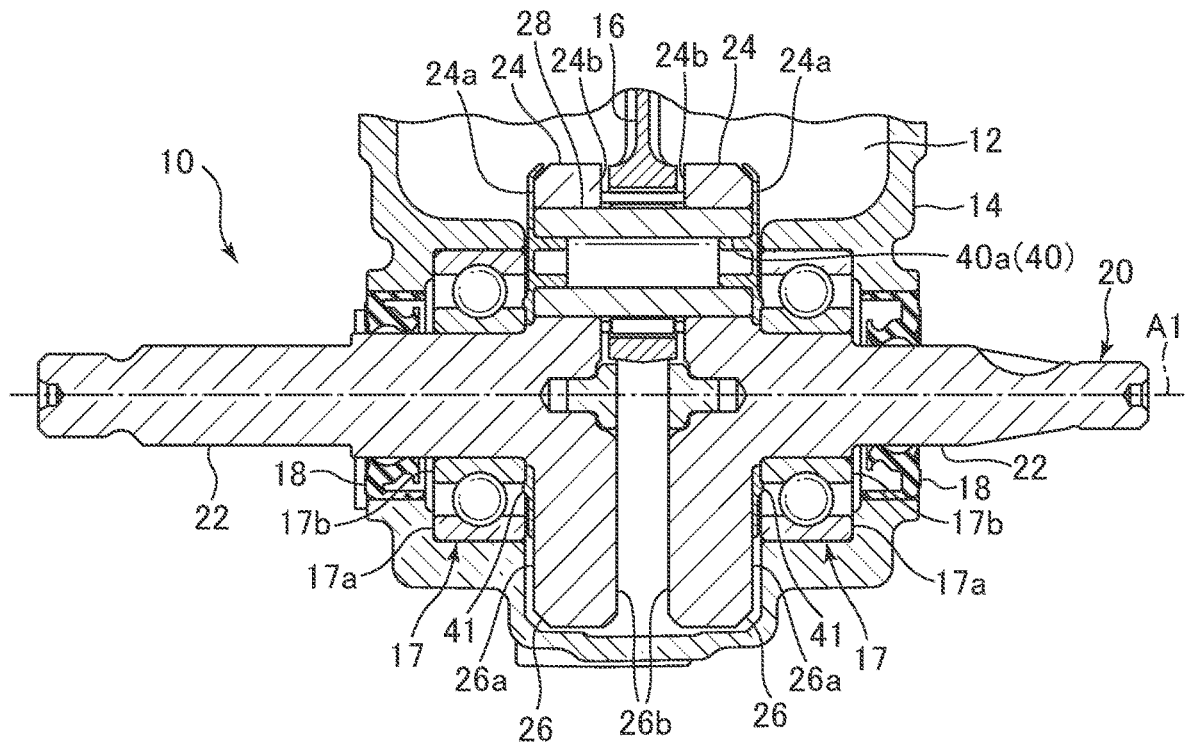
FIG. 1 is a partial cross-sectional front view of an engine having a rotary body according to the present invention.

Now, referring to the drawings, a first embodiment of a rotary body according to the present invention will be explained.

FIG. 1 shows a portion of an engine 10 which is a two-stroke engine with a single cylinder used in a small working machine, such as a chainsaw, a mower, and a blower. The engine 10 has a cylinder block 14 which defines a crank chamber 12, a crankshaft 20, and a connecting rod 16 for connecting the crankshaft 20 to a piston (not shown).

Figure 2:
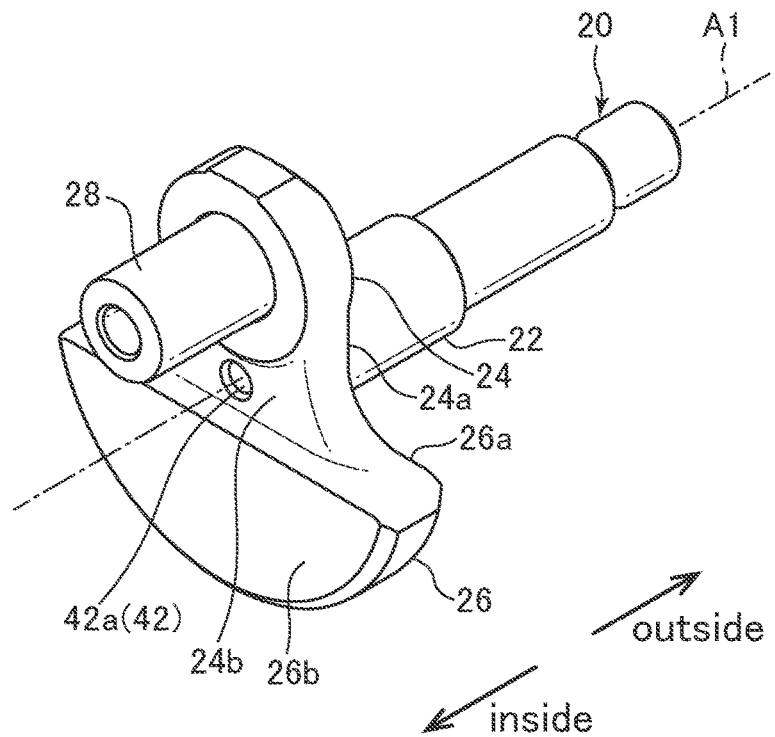
FIG. 2 is a partial perspective view of a crankshaft.

As shown in FIGS. 1 and 2, the crankshaft 20 is rotatable about a rotational axis A1, and has a pair of shaft portions 22 which are disposed on the rotational axis A1, a pair of arm portions 24 and a pair of counterweight portions 26 which portions 24, 26 extend from the shaft portion 22 in a direction perpendicularly to the rotational axis A1, and a crankpin portion 28 which extends from one of the pair of the arm portions 24 parallel to the rotational axis A1 to the other of the pair of the arm portions 24, and is offset from the rotational axis A1. Each of the shaft portions 22 is rotatably supported by a bearing 17 and extends toward the outside of the cylinder block 14 via an oil seal 18. For example, a flywheel (not shown) and a recoil starter (not shown) are attached to one of the shaft portions 22, while a clutch mechanism (not shown) is attached to the other of the shaft portions 22. The crankshaft 20 may be made of a metal such as SCM material. Hereinafter, for each of the arm portions 24, a side toward the other arm portion 24 is referred to as "inside", while the opposite side of the inside is referred to as "outside" (see FIG. 2).

Figure 3:
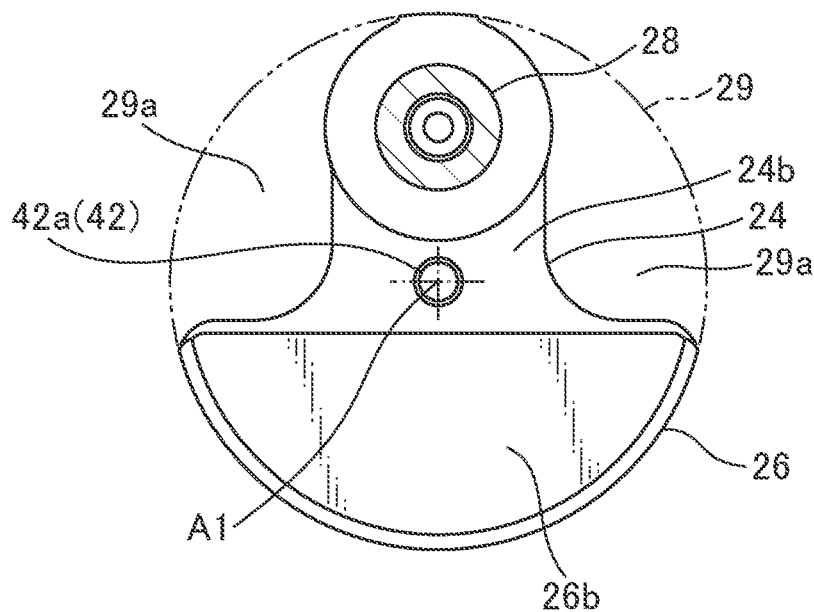
FIG. 3 is a cross-sectional view of the crankshaft viewing from its left side.

As shown in FIG. 3, viewing in a direction of the rotational axis A1 (or rotational-axis direction), the arm portion 24 and the counterweight portion 26 are arranged in a substantially T shape and are positioned within a virtual circle 29 around the rotational axis A1. Thus, spaces 29a within the virtual circle 29, in which neither the arm portion 24 nor the counterweight portion 26 are present, are caused on the opposite sides of the arm portion 24.

As shown in FIG. 2, the arm portion 24 has an outside surface 24a and an inside surface 24b. Further, the counterweight portion 26 has an outside surface 26a located in the same plane as the outside surface 24a of the arm portion 24, and an inside surface 26b located inside of the inside surface 24b of the arm portion 24. Namely, in the rotational-axis direction, a thickness of the arm portion 24 is less than a thickness of the counterweight portion 26.

Figure 4:
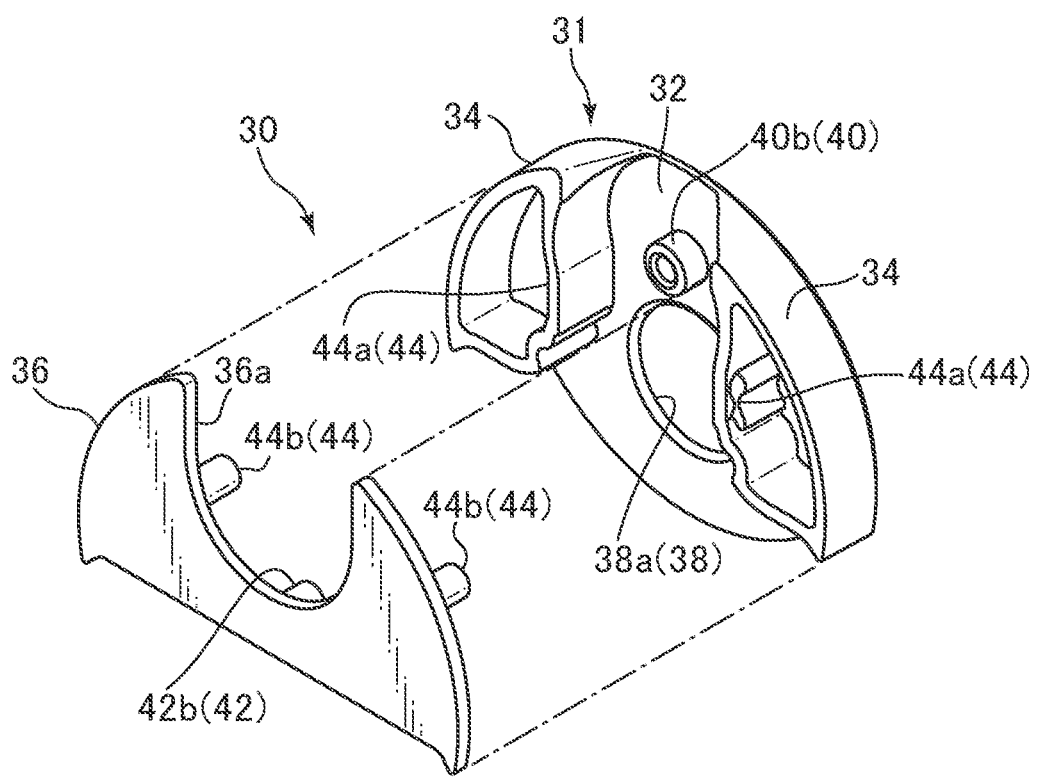
FIG. 4 is an exploded perspective view of the rotary body.
Figure 5:
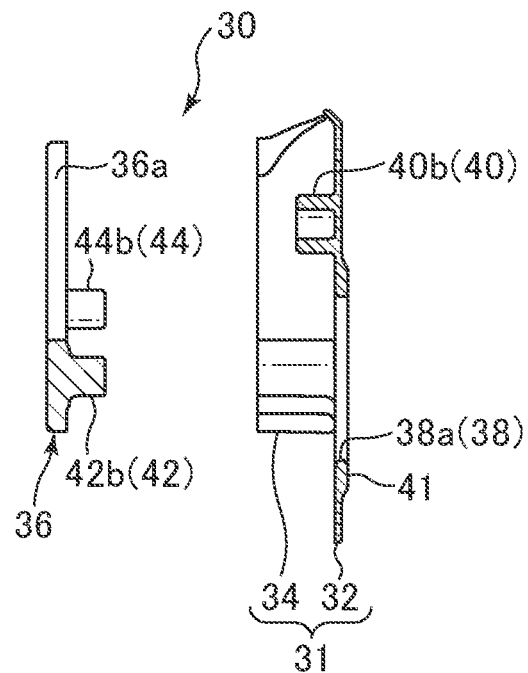
FIG. 5 is an exploded cross-sectional front view of the rotary body.

FIGS. 4 and 5 are an exploded perspective view and an exploded cross-sectional front view of a rotary body 30 according to the present invention, respectively. The rotary body 30 is positioned within the virtual circle 29, and includes an outside plate element 32 which is to be attached to the outside surface 24a of the arm portion 24 (and the outside surface 26a of the counterweight portion 26), a pair of filler elements 34 which are to be disposed in the spaces 29a on the opposite sides of the arm portion 24, and an inside plate element 36 which is to be attached to the inside surface 24b of the arm portion 24. The outside plate element 32 and the pair of the filler elements 34 are coupled with each other and, in this embodiment, these elements 32, 34 are pre-formed as a single outside part 31. The pair of the filler elements 34 and the inside plate element 36 are to be coupled with each other after the outside part 31 and the inside plate element 36 are attached to the crankshaft 20. The rotary body 30 may be made of lightweight resin, which may be lightweight, such as PA6, PA66 and PPS.

Figure 6:
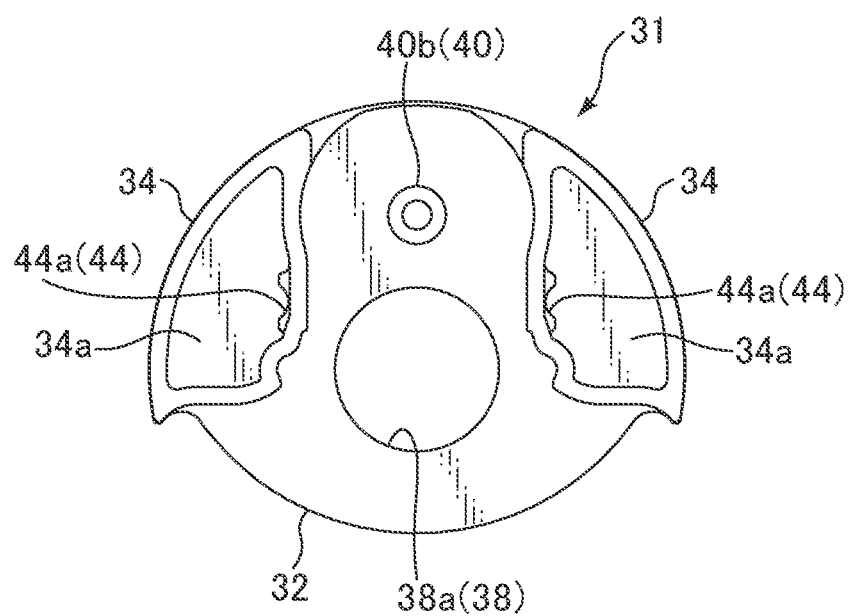
FIG. 6 is a left-side view of an outside part.

As shown in FIG. 1, the outside plate element 32 is positioned between the arm portion 24 and the bearing 17. A thickness of the outside plate element 32 in the rotational-axis direction is, for example, within a range of 1-2 mm. As shown in FIGS. 4-6, a first engagement feature 38 is provided for positioning the outside plate element 32 with respect to the rotational axis A1. The first engagement feature 38 includes, for example, a portion of the shaft portion 22 and an aperture 38*a* formed in the outside plate element 32 to fit onto the portion of the shaft portion 22.

A second engagement feature 40 is provided for positioning the outside plate element 32 with respect to the arm portion 24 and the crankpin portion 28. The second engagement feature 40 includes, for example, an aperture 40*a* formed in the crankpin portion 28 (see FIG. 1) and a pin 40*b* formed on the outside plate element 32 to fit into the aperture 40*a*.

As shown in FIGS. 1 and 5, the outside plate element 32 (the reference number is omitted in FIG. 1) preferably has an annular protrusion 41 extending between an outer ring 17*a* and an inner ring 17*b* of the bearing 17.

As can be seen from FIGS. 3 and 6, each of the filler elements 34 has a profile to fill the space enclosed by the virtual circle 29, the arm portion 24, and the counterweight portion 26. In this embodiment, each of the filler elements 34 includes an interior space 34*a* and is integrally formed with the outside plate element 32. A thickness of the filler elements 34 in the rotational-axis direction is preferably equal to the thickness of the arm portion 24 in the rotational-axis direction.

Figure 7:
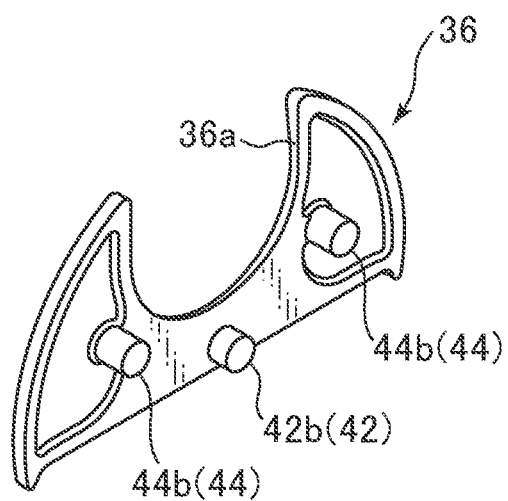
FIG. 7 is a perspective view of an inside plate element.
Figure 8:
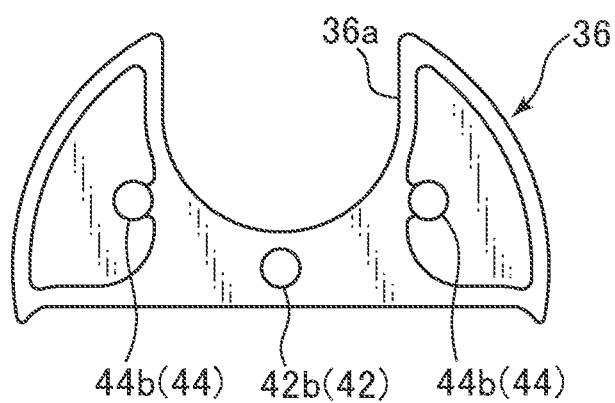
FIG. 8 is a right-side view of the inside plate element.

As shown in FIGS. 7 and 8, the inside plate element 36 includes an edge portion corresponding to the pair of the filler elements 34, another edge portion corresponding to a border of the counterweight portion 26, and a cutout 36*a* to avoid interference with the crankpin portion 28. In the rotational-axis direction, a thickness of the inside plate element 36 is preferably the same as a difference between the thickness of the counterweight portion 26 and the thickness of the arm portion 24, and, for example, within a range of 1-2 mm.

Figure 9:
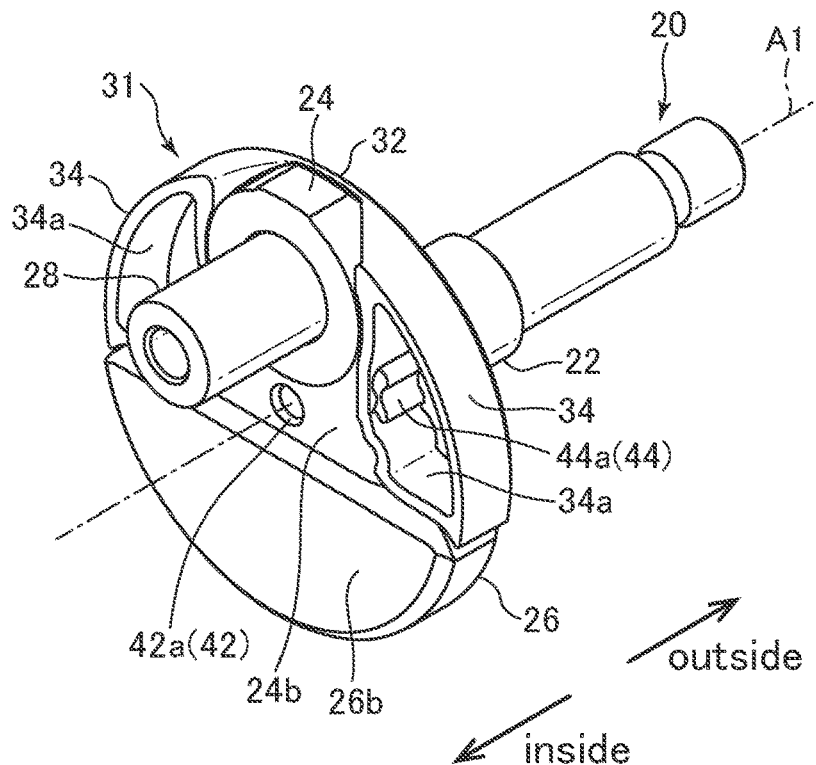
FIG. 9 is a perspective view of the outside part assembled into the crankshaft.
Figure 10:
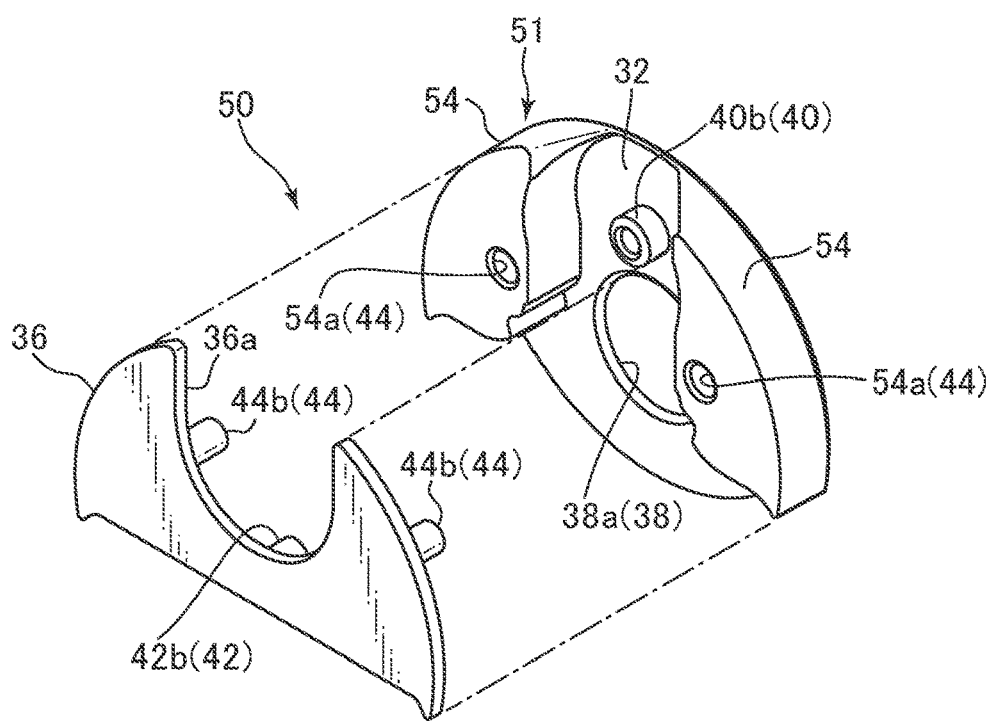
FIG. 10 is an exploded perspective view of the rotary body of a second embodiment.

As shown in FIGS. 7-9, a third engagement feature 42 is provided for positioning the inside plate element 36 with respect to the arm portion 24. The third engagement feature 42 includes, for example, an aperture 42*a* provided in the inside surface 24*b* of the arm portion 24 and on the rotational axis A1 (see FIG. 9), and a pin 42*b* formed on the inside plate element 36. In this way, the third engagement feature 42 and the aperture 38*a* of the outside plate element 32 are arranged coaxially with the rotational axis A1.

As shown in FIGS. 6-9, a fourth engagement feature 44 is provided for positioning the inside plate element 36 with respect to the pair of the filler elements 34. The fourth engagement feature 44 includes, for example, recesses 44*a* formed on the filler elements 34, and pins 44*b* formed on the inside plate element 36. A thickness of the inside plate element 36 including the pin 42*b* and the pins 44*b* is preferably less than a distance between the pair of the counterweight portions 26.

Next, an assembling procedure of the rotary body 30 will be explained.

After the crankshaft 20 is assembled and adjusted, the inside plate element 36 is attached to the crankshaft 20. Since the thickness of the inside plate element 36 including the pin 42*b* and the pins 44*b* is less than the distance between the pair of the counterweight portions 26, the inside plate element 36 can be passed between the pair of the counterweight portions 26. The inside plate element 36 is positioned with respect to the rotational axis A1 by the third engagement feature 42.

Then, the outside part 31 (namely, the outside plate element 32 and the pair of the filler elements 34 which are integrally formed) is attached to the crankshaft 20 (see FIG. 9 in which the inside plate element 36 is omitted). The outside part 31 is positioned with respect to the rotational axis A1 and the arm portion 24 by the first and second engagement features 38, 40. Further, the fourth engagement feature 44 allows the outside part 31 (particularly, the pair of the filler elements 34) and the inside plate element 36 to be positioned with respect to each other. Then, the inside plate element 36 is bonded or welded to peripheries of the pair of the filler elements 34 so that the interior spaces 34*a* of the filler elements 34 are sealed. The welding is, for example, vibration welding.

Since the rotary body 30 configured as explained above is made of resin and attached to the crankshaft 20 to surround the arm portion 24, metal is not needed to be used. This allows the rotary body 30 to be maintained lightweight. Further, since each of the pair of the filler elements 34 has its interior space 34*a*, the rotary body 30 can be made more lightened. Further, since the rotary body 30 is positioned to the crankshaft 20 by the engagement features 38, 40, 42, 44, deformation of the rotary body 30 due to its rotation at a high speed can be restricted. Also, the annular protrusion 41 extending between the outer ring 17*a* and the inner ring 17*b* of the bearing 17 allows a strength of the outside plate element 32 to increase.

Since each of the filler elements 34 has the profile to fill the space surrounded by the virtual circle 29, the arm portion 24 and the counterweight portion 26, an empty space in the crank chamber 12 can be reduced. The combination of the inside plate element 36 and the outside part 31 also allows a distance between the pair of arm portions 24 to be reduced, and allows the empty space in the crank chamber 12 to be further reduced. The annular protrusion 41 extending between the outer ring 17*a* and the inner ring 17*b* of the bearing 17 further allows the empty space in the crank chamber 12 to be reduced.

Next, a second embodiment of the rotary body will be explained.

A rotary body 50 of the second embodiment has the same structure as that of the rotary body 30 of the first embodiment except that a pair of filler elements 54 are solid.

Each of the pair of the filler elements 54 is solid. Further, a fourth engagement feature 44 is provided for positioning the inside plate element 36 with respect to the pair of the filler elements 54. The fourth engagement feature 44 includes, for example, through apertures 54*a* formed in the filler elements 54 and the outside plate element 32, and pins 44*b* disposed on the inside plate element 36. A thickness of the inside plate element 36 including the pin 42*b* and the pins 44*b* is preferably less than a distance between the pair of the counterweight portions 26.

Next, an assembling procedure of the rotary body 50 will be explained.

After the crankshaft 20 is assembled and adjusted, the inside plate element 36 is attached to the crankshaft 20 as in the rotary body 30 of the first embodiment. Then, the outside part 51 (the outside plate element 32 and the pair of the filler elements 54 which are integrally formed) are attached to the crankshaft 20 as in the rotary body 30 of the first embodiment. Then, the pins 44b and the through apertures 54a are bonded or welded. The welding is, for example, vibration welding.

In the rotary body 50 configured as explained above, when the inside plate element 36 and the outside part 51 are coupled to each other, the pin 44b can be bonded or welded to the through aperture 54a by accessing from an outside area of the through aperture 54a. This allows the rotary body 50 to be easily attached to the crankshaft 20. In this case, the inside plate element 36 may not be bonded or welded to the peripheries of the filler elements 54. Although the inside plate element 36 and/or the filler elements 54 may be deformed due to a high rotational speed, the Applicant confirmed by his analysis that such deformation could be minimized by placing the pin 44b and the through aperture 54a at a position of center of gravity of each of the pair of the filler elements 54.

Although the embodiments of the present invention have been now described, the present invention is not limited to the above-described embodiments, and various modifications can be made within the scope of the invention recited in the claims, and it is needless to say that such modifications are also fallen within the scope of the present invention.

Although in the above-described embodiments, the rotary body 30, 50 is attached to the crankshaft 20 of the two-stroke engine 1, the rotary body 30, 50 may be applied to any crankshafts.

Although in the above-described embodiments, the outside plate element 32 and the pair of the filler elements 34, 54 are integrally pre-formed, the inside plate element 36 and the filler elements 34, 54 may be integrally pre-formed, to which the outside plate element 32 may be assembled later.

17: bearing
20: crankshaft
22: shaft portion
24: arm portion
24a: outside surface
24b: inside surface
26: counterweight portion
28: crankpin portion
30, 50: rotary body
31, 51: outside part
32: outside plate element
34, 54: filler element
34a: interior space
36: inside plate element
38a: aperture (first engagement feature)
40: second engagement feature
41: annular convex portion
44b: pin
54a: through aperture
A1: rotational axis

What is claimed:

1. A rotary body made of resin and attached to a crankshaft which is rotatable about a rotational axis, and has a shaft portion which is disposed on the rotational axis and supported by a bearing, an arm portion and a counterweight portion which are connected to an end of the shaft portion perpendicularly with respect to the rotational axis, and a crankpin portion which is offset from the rotational axis and extends from the arm portion parallel to the rotational axis, the arm portion having an outside surface on a side toward the shaft portion, and an inside surface on a side toward the crankpin portion, and the rotary body comprising:

an outside plate element which is attached to the outside surface of the arm portion, an inside plate element which is attached to the inside surface of the arm portion, and a pair of filler elements which are disposed between the outside plate element and the inside plate element and on both sides of the arm portion, wherein the outside plate element and the pair of filler elements are coupled to each other, and the pair of filler elements and the inside plate element are coupled to each other, and wherein each of the pair of filler elements has an interior space sealed by the outside plate element and the inside plate element.

2. The rotary body according to claim 1, wherein the outside plate element has an aperture for fitting onto the shaft portion, and the inside plate element has an engagement feature to be positioned to the arm portion.

3. The rotary body according to claim 2, wherein the outside plate element has an engagement feature to be positioned to the crankpin portion.

4. The rotary body according to claim 1, wherein the outside plate element and the pair of filler elements are integrally preformed as an outside part, and the inside plate element is coupled to the outside part.

5. The rotary body according to claim 1, wherein the outside plate element is disposed adjacent to the bearing supporting the shaft portion and has an annular protrusion extending between an outer ring and an inner ring of the bearing.

6. A rotary body made of resin and attached to a crankshaft which is rotatable about a rotational axis, and has a shaft portion which is disposed on the rotational axis and supported by a bearing, an arm portion and a counterweight portion which are connected to an end of the shaft portion perpendicularly with respect to the rotational axis, and a crankpin portion which is offset from the rotational axis and extends from the arm portion parallel to the rotational axis, the arm portion having an outside surface on a side toward the shaft portion, and an inside surface on a side toward the crankpin portion, the rotary body comprising:

an outside plate element which is attached to the outside surface of the arm portion, an inside plate element which is attached to the inside surface of the arm portion, and a pair of filler elements which are disposed between the outside plate element and the inside plate element and on both sides of the arm portion, wherein the outside plate element and the pair of filler elements are coupled to each other, and the pair of filler elements and the inside plate element are coupled to each other, and wherein each of the pair of filler elements is solid, the outside plate element and the pair of filler elements are integrally preformed as an outside part, each of the pair of filler elements has a through aperture fitted onto and coupled to a pin of the inside plate element, each of the through apertures are disposed at a position of a center of gravity of respective filler elements.

7. The rotary body according to claim 6, wherein the outside plate element has an aperture for fitting onto the shaft portion, and the inside plate element has an engagement feature to be positioned to the arm portion.

8. The rotary body according to claim 7, wherein the outside plate element has an engagement feature to be positioned to the crankpin portion.

9. A rotary body made of resin and attached to a crankshaft which is rotatable about a rotational axis, and has a shaft portion which is disposed on the rotational axis and supported by a bearing, an arm portion and a counterweight portion which are connected to an end of the shaft portion perpendicularly with respect to the rotational axis, and a crankpin portion which is offset from the rotational axis and extends from the arm portion parallel to the rotational axis, the arm portion having an outside surface on a side toward the shaft portion, and an inside surface on a side toward the crankpin portion, the rotary body comprising:
- an outside plate element which is attached to the outside surface of the arm portion, an inside plate element which is attached to the inside surface of the arm portion, and a pair of filler elements which are disposed between the outside plate element and the inside plate element and on both sides of the arm portion,
- wherein the outside plate element and the pair of filler elements are coupled to each other, and the pair of filler elements and the inside plate element are coupled to each other, and
- wherein the outside plate element is disposed adjacent to the bearing supporting the shaft portion and has an annular protrusion extending between an outer ring and an inner ring of the bearing.

10. The rotary body according to claim 9, wherein the outside plate element has an aperture for fitting onto the shaft portion, and the inside plate element has an engagement feature to be positioned to the arm portion.

11. The rotary body according to claim 10, wherein the outside plate element has an engagement feature to be positioned to the crankpin portion.

\* \* \* \* \*